United States Patent [19]
Visser

[11] 3,977,849
[45] Aug. 31, 1976

[54] SORPTION PUMP
[75] Inventor: Jan Visser, Eindhoven, Netherlands
[73] Assignee: U.S. Philips Corporation, New York, N.Y.
[22] Filed: Dec. 6, 1974
[21] Appl. No.: 530,166

Related U.S. Application Data
[62] Division of Ser. No. 352,583, April 19, 1973, Pat. No. 3,868,239.

[30] Foreign Application Priority Data
Jan. 29, 1973 Netherlands.................. 7301204

[52] U.S. Cl. ................................. 55/389
[51] Int. Cl.² ....................................... B01D 53/04
[58] Field of Search .................... 55/387–389, 55/417

[56] References Cited
UNITED STATES PATENTS
| 3,158,456 | 11/1964 | Norton | 55/388 |
| 3,264,803 | 8/1966 | Read | 55/389 |
| 3,868,239 | 2/1975 | Visser | 55/419 |

FOREIGN PATENTS OR APPLICATIONS
| 1,220,064 | 1/1971 | United Kingdom | 55/387 |

Primary Examiner—Bernard Nozick
Attorney, Agent, or Firm—Frank R. Trifari; J. David Dainow

[57] ABSTRACT

A sorption pumping device characterized in that a space to be evacuated can be connected to the sorption material successively at at least two different levels of the device.

3 Claims, 10 Drawing Figures

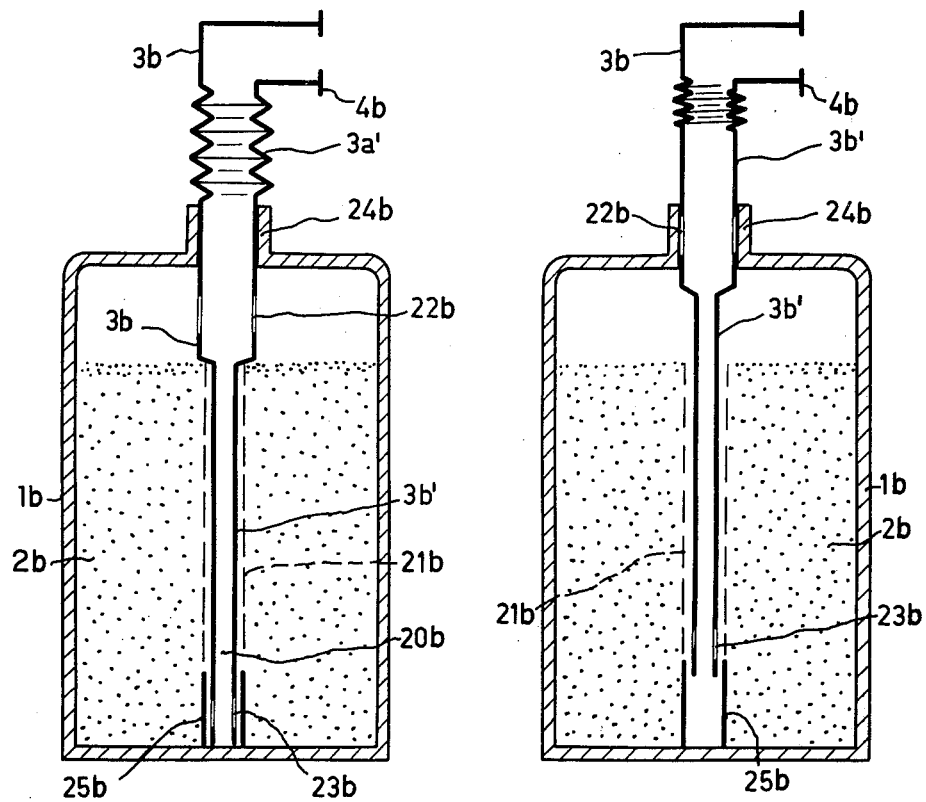
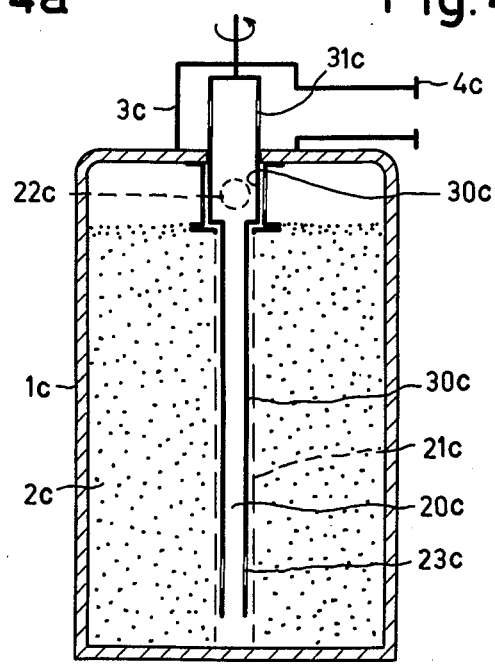

SORPTION PUMP

This is a division of application Ser. No. 352,583, filed Apr. 19, 1973 now U.S. Pat. No. 3,868,239.

BACKGROUND OF THE INVENTION

The invention relates to a sorption pumping device, provided with a reservoir for sorption material which can be made to communicate, via an inlet duct, with a space to be evacuated. Sorption pumping devices of the subject kind are known as appears from British patent specification Nos. 921,666 and 939,395.

Known sorption pumping devices have a single, fixed inlet duct. A drawback of this construction is that, particularly at lower starting pressures in the space to be evacuated, effective use is only made of the layers of sorption material which are situated in the immediate vicinity of the opening of the inlet duct in the reservoir. These layers are most favourably situated with respect to the gases to be pumped from the space to be evacuated. Consequently, the these layers obtain a comparatively dense population of gas molecules during pumping, while the population of the remaining layers, situated further from the inlet opening, remains comparatively small. The latter is also due to the fact that the gas diffusion from layers with dense population to layers of sparse population is low at the low operating temperature of the sorption material (usually liquid nitrogen temperature).

Because only a part of the sorption material is effectively utilized, the pump as such is comparatively quickly saturated so that a frequent reactivation of the sorption material is required. Moreover, comparatively long pumping times are required in order to achieve a given minimum pressure, for example, the starting pressure for getter-ion pumps. Furthermore, it is difficult to realize low final pressures in the space to be evacuated.

So as to achieve a more effective use of the sorption material which is situated further from the inlet opening, it has been proposed (Review of Scientific Instruments 34, May 1963, pages 587–588) to sub-divide the sorption material into separate layers distributed over a large number of trays which are arranged in the reservoir. The gas which is sucked in is then more uniformly distributed between the sorption material surfaces on the various trays.

A pumping device of this kind, however, not only has a complex and expensive construction, but its action is not optimum either. The latter is mainly due to the fact that during one and the same pumping cycle from high to low pressure, the gas flow is always applied to the surface of the sorption material along the same course.

SUMMARY OF THE INVENTION

The invention has for its object to provide a sorption pumping device which has a simple construction, a high effective sorption capacity and a high pumping speed, and which produces a low residual pressure. A high effective sorption capacity implies that a large number of pumping cycles can be performed without intermediate reactivation of the sorption material.

The sorption pumping device according to the invention is characterized in that the device is constructed such that the space to be evacuated can be connected to the sorption material successively at, at least two different levels of the reservoir.

Within the scope of the present invention, different reservoir levels are not to be understood to mean exclusively different levels in the axial direction of the reservoir, but also mutually different locations, viewed in the transversal direction of the reservoir.

By admitting the gas of high pressure from the space to be evacuated to the sorption material which is situated at a given level during the beginning of the pumping cycle, this material sorbs gas molecules, but the sorption material which is situated at a different level remains substantially clean. By subsequently admitting, during the final period of the pumping cycle, the gas of low pressure to this substantially pure sorption material (and if desired, at the same time to the material already contacted by the gas of high pressure), effective and quick sorption also takes place at low pressure. The sorption material is thus very effectively utilized, whilst short pumping times and low residual pressures in the vacuum space are achieved.

In a preferred embodiment of the sorption pumping device according to the invention, the inlet duct is provided with a hollow tube which is arranged to be axially slidable and/or rotatable about its longitudinal axis in the reservoir and which is provided with at least two openings which are situated at a distance from each other in the axial direction of the tube, the said openings being successively released by axial displacement or rotation about the longitudinal axis of the tube.

The hollow tube can form an integral part of the inlet duct or be provided as a separate tube. The construction of this sorption pumping device is compact and simple.

A further preferred embodiment of the sorption pumping device according to the invention is characterized in that a hollow tube which is open on both ends is rigidly arranged inside the reservoir, one tube end being arranged, coaxial with the inlet duct, inside the opening of this duct into the reservoir and at a distance from the opening, so that an annular channel is formed, the inlet duct incorporating a closing member which is capable of successively releasing the opening in the said tube end and the annular channel.

A pumping device of this kind is also compact and can be readily manufactured by addition of the tube and the closing member to known pumping devices.

Another preferred embodiment of the sorption pumping device according to the invention is characterized in that the device is provided with at least a second inlet duct which can be closed and which is connected parallel to the inlet duct, all inlet ducts opening into the reservoir at mutually different levels.

According to the invention of at least one inlet duct, the level at which the said inlet duct opens into the reservoir is adjustable. This enables optimum local use of the sorption material.

The invention will be described in detail with reference to the accompanying drawings.

BRIEF DESCRIPTION OF THE DRAWINGS

FIGS. 1a and 4 to 8 are diagrammatic longitudinal sectional views (not to scale) of a few embodiments of sorption pumping devices.

FIG. 1b shows a modified construction of the inner part of the sorption pumping device according to FIG. 1a.

DESCRIPTION OF THE PREFERRED EMBODIMENT

Figure 1A:
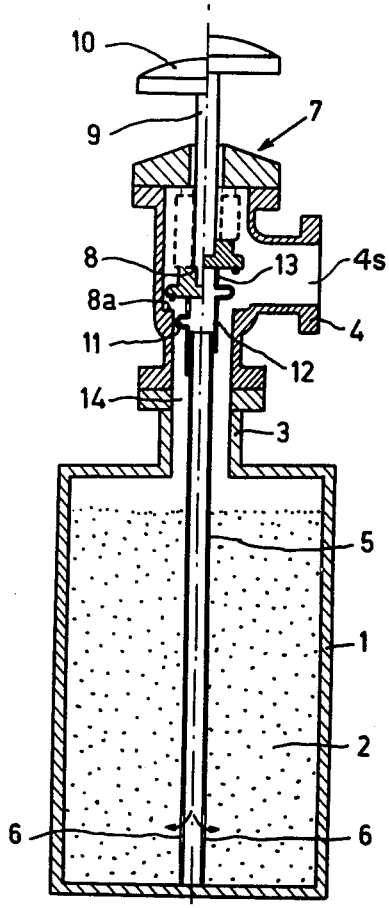

The reference numeral 1 in FIG. 1 denotes a reservoir in which a sorption material 2, for example, a natural or synthetic zeolite, is present. The reservoir has an inlet duct 3 which can be connected to a space 45 to be evacuated at the area of the flange 4. A hollow tube 5, arranged inside the reservoir and open on both ends, is arranged such that its upper end is situated inside and coaxial with inlet duct 3. The lower end of the tube is provided with side openings 6. A closing member 7, shown in two positions, comprises a valve body 8 which can cooperate with a valve seat 8a in a sealing manner. Valve body 8 is connected, via a valve rod 9, to a control member 10. The lower side of valve body 8 carries a flexible, annular diaphragm 11 which carries a cylindrical sleeve. This sleeve fits exactly about the end of tube 5 and can be slid thereon in a reciprocating manner. Radial openings 13 are provided above diaphragm 11. The diaphragm is capable of closing annular space 14.

The sorption pumping device furthermore comprises ducts (not shown) for cooling liquid (liquid nitrogen) for cooling the adsorbent material, and an outlet (not shown) for the gases released during the reactivation of the adsorption material. The sorption pumping device is operated as follows. During the first period of the pumping cycle, when a higher pressure prevails in the space to be evacuated, the closing member 7 is in the position which is shown at the left in the drawing. Gas then flows via openings 13, tube 5 and openings 6 to the lower layers of the adsorption material 2 where it is adsorbed, while the annular space 14 is closed by diaphragm 11 so that the upper layers of adsorption material remain pure. During the second period of the pumping cycle, at a lower pressure in the space to be evacuated, closing member 7 is set to and held in the position which is shown at the right in the drawing. Annular space 14 is then released by diaphragm 11. Gas of lower pressure now flows to the upper pure layers of adsorption material via annular space 14 as well as to the lower layers via tube 5. After termination of the pumping cycle, closing member 7 is closed. Valve body 8 then bears on valve seat 8a, so that both tube 5 and annular space 14 are closed.

Figure 1B:
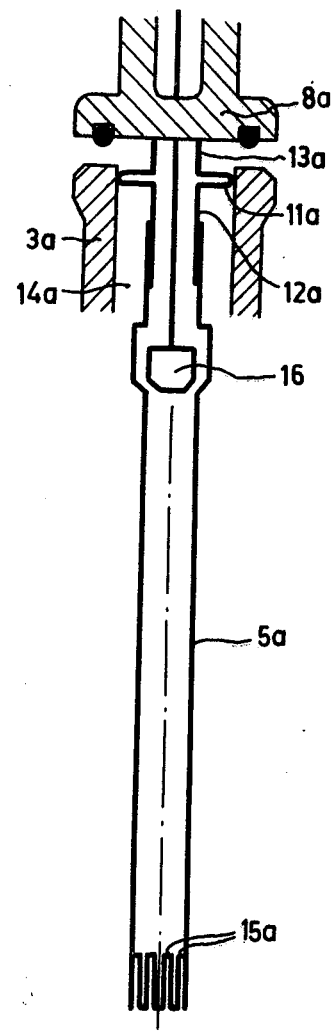

FIG. 1b shows a variant of the inner part of the pumping device of FIG. 1a. The same reference numerals but with a suffix a are used for corresponding parts. In the present case sleeve 12a slides inside tube 5a, the lower side of which is provided with a number of slots 15a which are distributed over the circumference and through which gas can flow the adsorption material. Valve body 8a now also carries a further valve body 16a. In the position shown, annular space 14a is closed by diaphragm 11a and tube 5a is accessible via openings 13a. When valve body 8a is moved upwards, diaphragm 11a releases annular space 14a, while the upper side of the further valve body 16a also moving upwards closes tube 5a.

Figure 2:
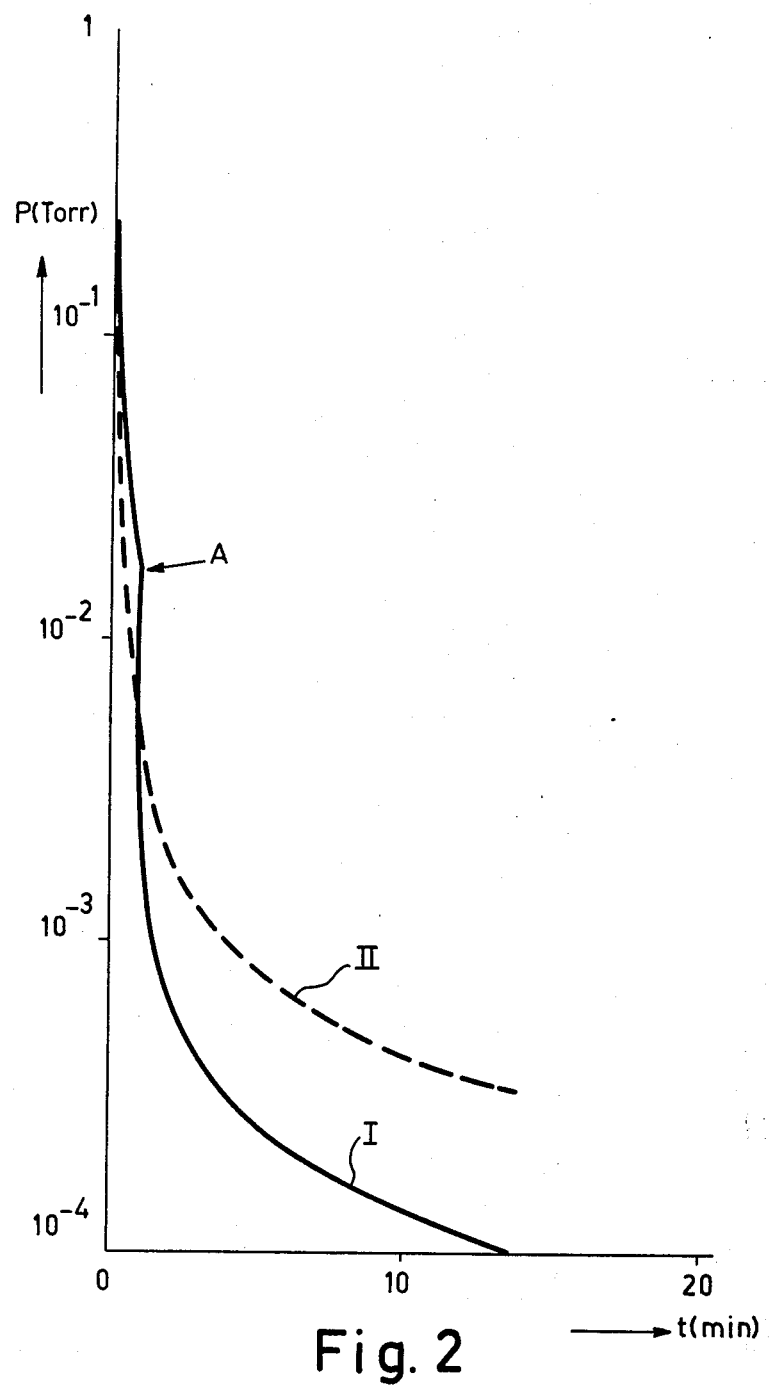
FIGS. 2 and 3 show graphs, each graph comprising a pumping curve for the sorption pumping device according to FIG. 1a in comparison with that of a known sorption pumping device.

Using the sorption pumping device shown in FIG. 1a, a space in which air was present at a pressure of 0.55 torr (1 torr = 1 mm mercury pressure) was evacuated. The pressure P as a function of the time $t$ for the first pumping cycle is denoted in FIG. 2 by curve I. Point A denotes the switching point at which a change-over was made from pumping exclusively through the lower layers of adsorption material via tube 5 to pumping through both the upper clean layers via annular space 14 and the said lower layers.

Curve II shows the result for the first pumping of the same space, in which air under a pressure of 0.55 torr was again present, through the same quantity of the same clean adsorption material as in the first case. This material was situated in a pump as shown in FIG. 1a in which now, however, tube 5, sleeve 12 and diaphragm 13 were lacking, so that via inlet duct 3 pumping was effected in known manner exclusively from the upper layers of adsorption material.

The graph clearly shows that shorter pumping times and lower final pressures are achieved by means of the pumping device according to FIG. 1a than by means of the known pumping device.

Figure 3:
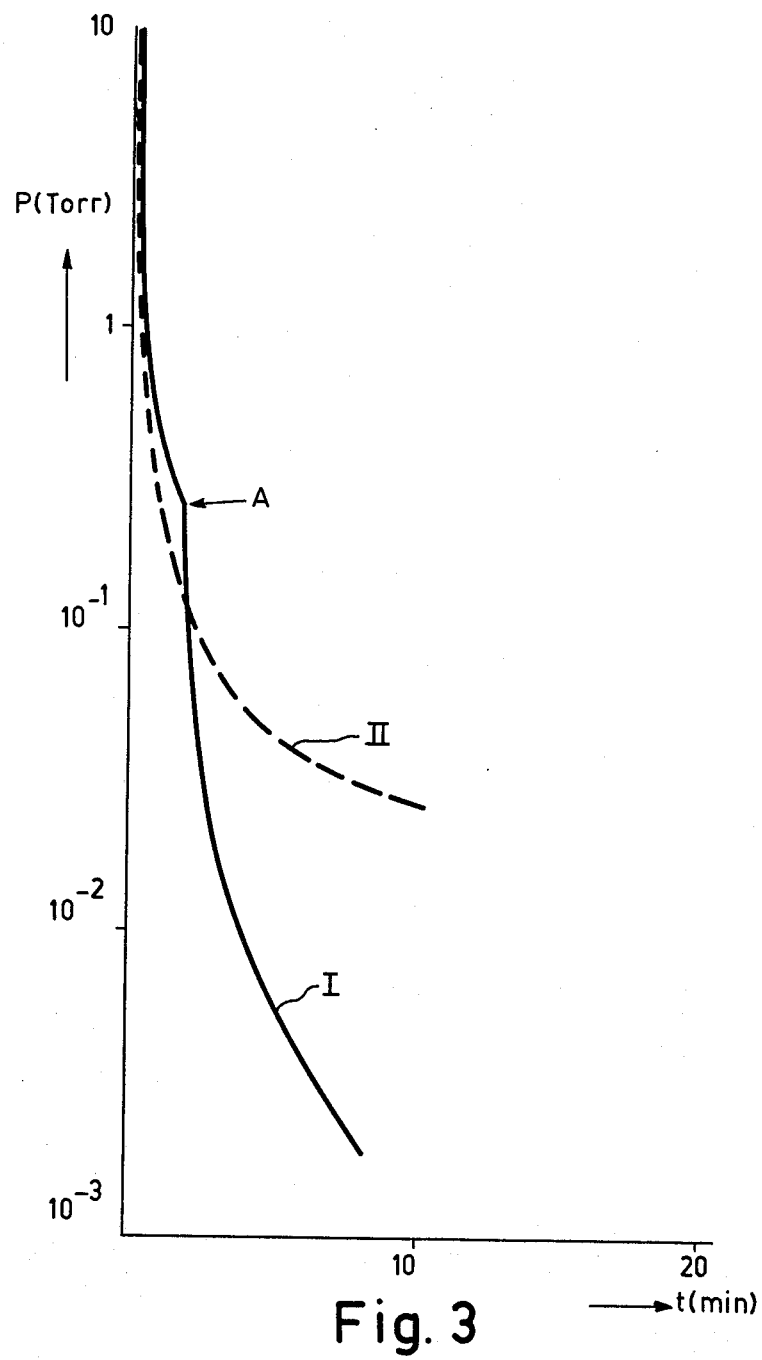

FIG. 3 shows the pumping curves for air for the above sorption pumping devices, the space to be evacuated being pumped down from 80 torr, after seven pumping cycles from 80 Torr had already been performed in both cases and the adsorption material thus already having been saturated to a given extent.

A comparison of the two curves shows that the sorption pumping device according to FIG. 1a also has a higher effective sorption capacity than the sorption pumping device of known construction.

Figures 6, 7:
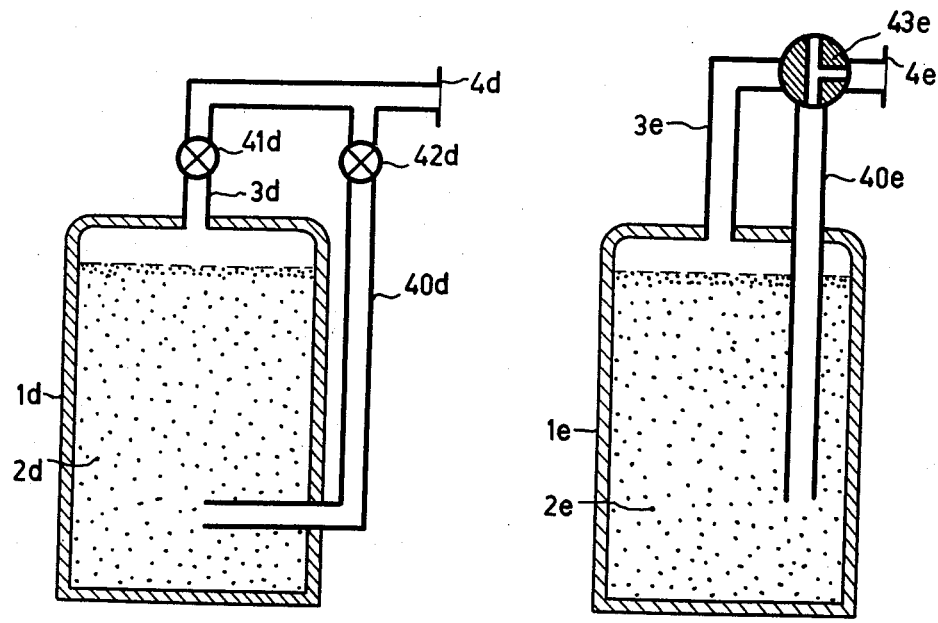
Figure 8:
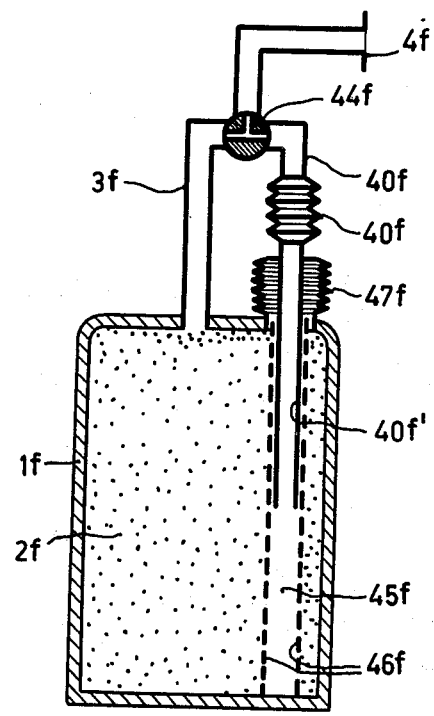

Parts of the sorption pumping devices according to the FIGS. 4 to 8 which correspond to the device according to FIG. 1a are denoted by the same reference numerals but with a suffix b for FIGS. 4a and 4b, c for FIG. 5, d for FIG. 6, e for FIG. 7, and f for FIG. 8.

In the sorption pumping device according to FIG. 4, the inlet duct 3b comprises a flexible portion 3a' which is constructed as a bellows, and an end portion 3b' in the form of a hollow tube which is axially slidable with respect to the reservoir inside duct 20b the said duct being separated from the adsorption material by a gauze layer 21b. The end portion comprises openings, 22b and 23b, at two different levels. When end portion 3b' is moved up and down, openings 22b can be alternately closed and released by cylindrical sleeve 24b, and openings 23b by cylindrical sleeve 25b, however, such that while openings 22b are closed openings 23b are released and vice versa. FIG. 4a shows the position in which openings 22 are released and openings 23b are closed, while the reversed situation is shown in FIG. 4b. A space to be evacuated can thus be successively connected at different levels to the adsorption material, first via openings 23b and subsequently via openings 22b. End portion 3b can also be constructed as a separate sleeve, the upper end of which slides though inlet duct 3b.

In the sorption pumping device shown in FIG. 5, tube 30c is arranged to be rotatable about its longitudinal axis inside reservoir 1c. Due to the rotation, the openings 22c are alternately closed and released. The gas which is drawn from the space to be evacuated can first be exclusively applied to the lower layers of sorption material via openings 31c, tube 30c and openings 23c, and subsequently, as a result of the release of openings 23c, it can be applied mainly to the upper layers and to a lesser extent to the lower layers.

It is obvious that constructions are alternatively feasible in which the passage openings for drawn-in gas can be released and closed by combined sliding and rotation of the tube.

The sorption pumping device shown in FIG. 6 comprises manifold duct 4*d* communicating with a second inlet duct 40*d* which is connected parallel to a first inlet duct 3*b* and which opens into reservoir 1*d* at a different and higher level than second duct 40*d*. A closing member or valve 41*d*, 42*d* is incorporated in each of the ducts 3*d* and 40*d*, respectively.

The sorption pumping device shown in FIG. 7 comprises a three-way valve 43*c* by means of which the inlet ducts 3*e* and 40*e* can be separately and simultaneously connected to the space to the evacuated.

The sorption pumping device shown in FIG. 8 also comprises a three-way valve 44*f*. Inlet duct 40*f* comprises a flexible intermediate portion 40*f* which is constructed as a bellows and which enables reciprocating movement of the lower portion 40*f* in duct 45*f* inside reservoir 1*f*. A gauze layer 46*f* separates the adsorption material 2*f* from the duct 45*f*. A second bellows 47*f*, connected on the one side to the reservoir and on the other side to lower portion 40*f*, acts as a flexible sealing. This construction enables evacuation at more than two different levels of the reservoir, even though only two inlet ducts are present.

In addition to the embodiment shown, there are of course other feasible embodiments, for example, constructions in which the two inlet ducts are connected at (diametrically) opposed locations on the sidewalls of the reservoir, or constructions in which more than two inlet ducts are present.

What is claimed is:

1. In a sorption pumping device connectible to a space to be evacuated, the device including a housing which when upright has upper and lower parts with walls which define therein a reservoir containing a quantity of sorption material to be situated in said reservoir at corresponding, vertically-spaced upper and lower elevations therein, the improvement in combination therewith wherein said housing includes and aperture in said walls, and a blocking member in each of said upper and lower parts, and said device comprises a tubular duct extending through said aperture and into said reservoir defining a bore therethrough and having an intermediate part and upper and lower end parts, and a port in each end part communicating via the bore of said duct with said space to be evacuated, said duct being axially movable between the first position wherein said upper port is closed by said upper blocking member and said lower port is exposed and communicates with said sorption material in said lower part of the reservoir, and a second position wherein said lower port is closed by said lower blocking member and said upper port is exposed and communicates with said material in said upper part of the reservoir.

2. Apparatus according to claim 1, wherein said upper and lower seals each comprise a tubular sleeve having a bore for telescopically receiving one end of said duct, each of said ports being sealed when adjacent one of said sleeves.

3. Apparatus according to claim 2 wherein said upper seal and port comprise a first valve means, and said lower seal and port comprise a second valve means, and axial movement of said duct operates both valve means simultaneously, for opening one valve while closing the other.

* * * * *

UNITED STATES PATENT AND TRADEMARK OFFICE
CERTIFICATE OF CORRECTION

PATENT NO. : 3,977,849
DATED : August 31, 1976
INVENTOR(S) : JAN VISSER

It is certified that error appears in the above-identified patent and that said Letters Patent are hereby corrected as shown below:

Column 1, line 22, delete "the"

Column 3, line 10, "45" should be --4s--

Column 5, line 4, "3b" should be --3d--

Signed and Sealed this

Fourteenth Day of December 1976

[SEAL]

Attest:

RUTH C. MASON
Attesting Officer

C. MARSHALL DANN
Commissioner of Patents and Trademarks